Nov. 2, 1948.    O. B. SUTTON    2,452,699
REFRIGERATION
Filed Feb. 18, 1944
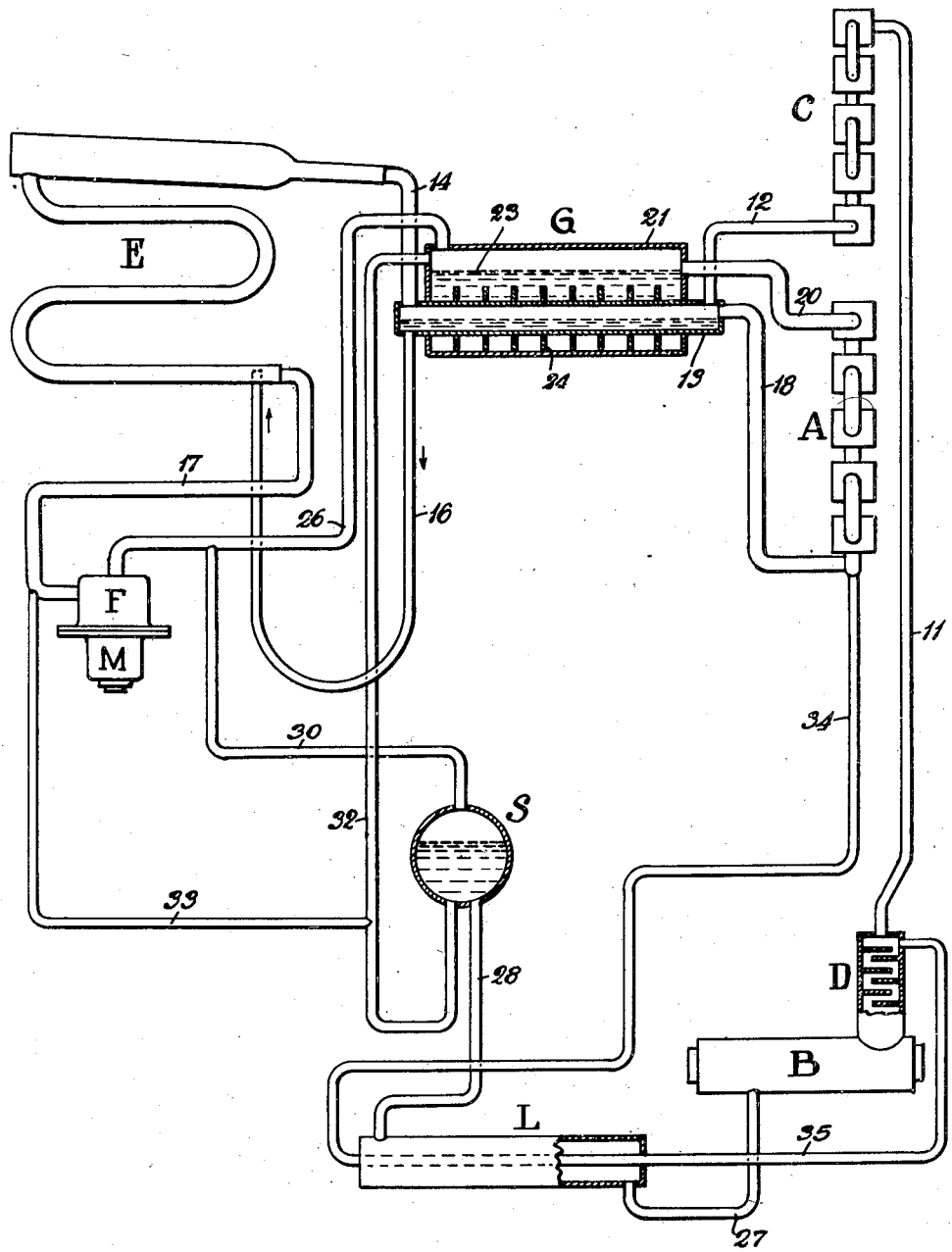
Inventor
Otis B. Sutton
by Harry S. Dunarre
Attorney.

Patented Nov. 2, 1948

2,452,699

UNITED STATES PATENT OFFICE 2,452,699

REFRIGERATION

Otis B. Sutton, Canton, Ohio, assignor to The Hoover Company, North Canton, Ohio, a corporation of Ohio Application February 18, 1944, Serial No. 522,858

9 Claims. (Cl. 62—119.5)

This application relates to the art of refrigeration and more particularly to an apparatus of the absorption type employing inert gas particularly characterized by a novel heat exchange arrangement to improve the efficiency and operating characteristics thereof.

More specifically, the invention has for an object the provision of a refrigerating apparatus of the above described character in which a secondary evaporative or pre-cooler effect is utilized to enhance the operating characteristics of the primary evaporator and also to promote the absorption process.

It is a further object of the invention to provide an inert gas type absorption refrigerating apparatus in which the production of extremely low temperatures is facilitated by supplying the evaporator with very cold refrigerant and cold inert gas containing very little admixed refrigerant vapor.

It is a further object of the present invention to provide an absorption refrigerating apparatus of the inert gas type in which the liquid refrigerant enroute to the evaporator is brought into contact with the cold rich inert gas discharging from the evaporator whereby an evaporative pre-cooling effect is achieved and in which heat is absorbed in the evaporative pre-cooler from lean absorption solution in contact with lean inert gas in order to provide highly deconcentrated inert gas for the evaporator.

Other objects and advantages of the invention will become apparent as the description proceeds when taken in connection with the accompanying drawings in which the single figure is a diagrammatic representation of a three-fluid absorption refrigerating apparatus embodying the present invention.

The refrigerating apparatus depicted will be charged with a suitable refrigerant such as ammonia, an absorbent therefor, such as water, and an inert pressure equalizing medium, preferably a dense gas like nitrogen.

A suitable means, not shown, such as a combustible fuel burner will apply heat to the generator B and the rich solution therein contained. The vapor evolved from the generator passes up through the analyzer D, conduit 11 to the condenser C wherein it is condensed by heat exchange with atmospheric air and then flows in liquid form through conduit 12 into the inner vessel 13 of the multiple heat exchange structure G. The liquid refrigerant collecting in vessel 13 is contacted by cold rich inert gas flowing from the evaporator E through the conduit 14.

A certain amount of the refrigerant in the vessel 13 evaporates into the rich inert gas serving to cool the gas, to pre-cool the liquid refrigerant and to cool the other portions of the heat exchange structure in a manner to be described hereinafter.

Cold refrigerant flows through the U-shaped conduit 16 from the bottom portion of vessel 13 into the bottom portion of the evaporator E. Lean inert gas is placed under pressure by the circulating fan F which is driven by an electrical motor M and is supplied to the evaporator through conduit 17. The evaporator E may be of any desired type; however, as illustrated it is of the type in which the high velocity dense inert gas serves to propel the liquid upwardly through the evaporator as the liquid evaporates into the inert gas. A preferred form of evaporator is disclosed in United States Letters Patent No. 2,328,196, dated August 31, 1943.

Due to the relatively high pressure at the bottom of the evaporator, the vessel 13, which is substantially at the gas pressure prevailing at the top of the evaporator, should be slightly higher than the point of connection between the evaporator E and conduit 16 to compensate for the high pressure prevailing at the gas inlet portion of the evaporator.

The cold rich gas in vessel 13 discharges therefrom through conduit 18 to the bottom portion of the tubular air-cooled absorber A and flows upwardly therethrough in contact with absorbing solution which is supplied in the lean condition to the upper portion of the absorber in a manner to be described hereinafter. The lean inert gas is conveyed from the absorber A by conduit 20 to the outer vessel 21 of the heat exchange structure G.

In vessel 21 the inert gas is brought into contact with a body of lean absorbent solution 23 which is cooled by heat exchange with the outer walls of vessel 13 and the heat conducting fins 24 attached thereto. The refrigerant vapor content of the inert gas in vessel 21 is greatly reduced by absorption in the very cold lean absorption solution in vessel 21 and the resulting very lean gas is then conveyed through conduit 26 to the circulating fan F which completes the circuit for the inert gas.

The lean solution formed in the boiler B by the evolution of refrigerant vapor is conveyed therefrom to the solution reservoir S by way of conduit 27, the outer path of liquid heat exchanger L and conduit 28. The liquid level in the reservoir S is above that in the boiler analyzer assembly BD by reason of the fact that the boiler assembly is in communication with the inner part of the vessel 13 through conduit 12, condenser C and conduit 11, wherefore the same is subjected to a relatively high pressure whereas the vessel S is vented through conduit 30 to the suction conduit 26 of the circulating fan F and is thus maintained at the lowest pressure prevailing in the entire system. This type of solution circuit arrangement is disclosed in United States Letters Patent No. 2,239,143, dated April 22, 1941.

The lean solution is conveyed from reservoir S to vessel 21 by gas lift pump conduit 32 which receives pumping gas through a bleed conduit 33 connected to the discharge conduit 17 of the circulating fan F. The solution collects in vessel 21 in pool 23 until the same begins to overflow through conduit 20 into the absorber A. As the slightly enriched solution flows into the absorber A it again contacts the inert gas stream and is progressively enriched as it flows through the absorber A, producing rich solution which is conveyed from the bottom portion of absorber A to the upper portion of the analyzer D by way of conduit 34, the inner path of liquid heat exchanger L and the conduit 35, thus completing the circuit for the absorbing solution.

In the operation of the above described apparatus the rich gas flowing into the bottom portion of the absorber is cooled in its passage through the vessel 13 and hence is in ideal condition to give up its refrigerant vapor to the absorption solution which it meets in the absorber. Likewise the lean gas is substantially cooled and its refrigerant vapor content reduced to an extreme degree by absorption in the very cold lean absorption solution pool 23 in vessel 21. The liquid refrigerant is also cold wherefore the combination of cold liquid refrigerant and cold inert gas having a very low refrigerant vapor content produces refrigeration at extremely low temperature levels.

The series of individual processes which occur in the element G includes evaporation of liquid refrigerant in the rich inert gas to produce a refrigerating effect, pre-cooling of the refrigerant, a second or end absorbing step and a heat transfer between the gas streams entering and leaving the evaporator, the absorbing solution and refrigerant liquid.

The element G is preferably positioned above the lowest part of the evaporator in order to compensate for the pressure differential between said part of the evaporator and the interior of the vessel 13. The absorber is preferably constructed in the form of a vertical sinuous tube provided with heat rejecting fins, as illustrated, and is preferably positioned at a level directly beneath the condenser and approximating the elevation of the vessel G.

The vessel G should be insulated for best results and preferably will be associated with a conventional type of cabinet in a manner similar to that in which the pre-cooler is associated with the cabinet in U. S. Letters Patent 2,363,999 issued November 11, 1944, to Curtis C. Coons. When the apparatus is associated with a cabinet the condenser and absorber may be positioned in vertically spaced relationship in a rear narrow vertical air flue and the remaining portion of the solution circuit may conveniently be positioned in a lower chamber entirely underlying the food storage compartment of the apparatus. The evaporator will be positioned interiorly of the cabinet.

While the invention is disclosed herein in considerable detail, various changes may be made in the arrangement, construction and proportion of the parts without departing from the spirit of the invention or the scope of the appended claims.

I claim:

1. In an absorption refrigerating apparatus of the inert gas type embodying an evaporator, an absorber and a condenser; means constructed and arranged to provide mutual heat transfer between lean solution enroute to the absorber, liquid refrigerant enroute to the evaporator and inert gas flowing into and away from the evaporator.

2. In an absorption referigerating apparatus of the inert gas type embodying an evaporator, an absorber and a condenser; means including a pre-cooler arranged to convey refrigerant liquid from said condenser to said evaporator, means including said pre-cooler for conveying rich inert gas from said evaporator to said absorber, and means for passing lean solution enroute to said absorber in heat exchange relation with said pre-cooler.

3. In an absorption refrigerating apparatus of the inert gas type embodying an evaporator, an absorber and a condenser; means including a pre-cooler arranged to convey refrigerant liquid from said condenser to said evaporator, and means for passing lean inert gas and lean absorption solution flowing to said absorber in contact with each other and in heat exchange relation with said pre-cooler.

4. Absorption refrigerating apparatus including an evaporator and an absorber connected to form an inert gas circuit, means for converting refrigerant vapor produced in a generator to liquid phase, a heat transfer vessel having two passageways for gas and liquid arranged in heat exchange relation with each other, one of said passageways being connected in said inert gas and solution circuit to bring lean absorption solution and lean inert gas into absorbing contact with each other and the other of said passageways being connected in said inert gas circuit to contain rich inert gas flowing to said absorber, and means including said other passageway for conducting refrigerant liquid from said condenser to said evaporator.

5. That method of promoting low temperature evaporation of a refrigerant liquid into an inert gas in a place of evaporation which includes the steps of chilling the refrigerant and inert gas flowing to the place of evaporation by evaporating a portion of the refrigerant into inert gas flowing from the place of the evaporation in heat exchange with inert gas flowing to the place of evaporation, and stripping the inert gas flowing to the place of evaporation by passing lean absorption solution in contact therewith while said inert gas is being chilled.

6. Absorption refrigerating apparatus including a generator and an absorber connected to form a solution circuit, an evaporator and said absorber connected to form an inert gas circuit, means for converting refrigerant vapor produced in the generator to liquid phase, a heat transfer structure including means forming a first gas and liquid passageway and means forming a second gas and liquid passageway surrounding said first passageway, means including said first liquid passageway for conducting refrigerant liquids from said liquifying means to said evaporator, said first liquid passageway being included in said inert gas circuit and arranged to receive inert gas flowing from said evaporator to said absorber, and said second passageway being included in said inert gas and solution circuits and arranged to receive inert gas flowing from said absorber to said evaporator and absorbing solution flowing from said generator to said absorber.

7. Absorption refrigerating apparatus including a generator and an absorber connected to form a solution circuit, an evaporator and said absorber connected to form an inert gas circuit, means for converting refrigerant vapor produced in the generator to liquid phase, a heat transfer structure including means forming a first gas and liquid passageway and means forming a second gas and liquid passageway surrounding said first passageway, means including said first liquid passageway for conducting refrigerant liquids from said liquifying means to said evaporator, said first liquid passageway being included in said inert gas circuit and arranged to receive inert gas flowing from said evaporator to said absorber, and said second passageway being included in said inert gas and solution circuits and arranged to receive inert gas flowing from said absorber to said evaporator, said heat transfer structure being so constructed and arranged that said first passageway is entirely surrounded by absorbing solution in said second passageway and heat conducting fins on said first passageway extending into said absorbing solution.

8. Absorption refrigerating apparatus comprising first and second evaporators, first and second absorbers, said first evaporator and said first absorber being arranged in heat exchange relationship, means for supplying refrigerant liquid to said first evaporator, means for conveying refrigerant liquid cooled in said first evaporator to said second evaporator, means for supplying absorbent to said absorbers, and means for flowing an inert gas from said first absorber to said second evaporator.

9. Absorption refrigerating apparatus comprising first and second evaporators, first and second absorbers, said first evaporator and said first absorber being arranged in heat exchange relationship, means for supplying refrigerant liquid to said first evaporator, means for conveying refrigerant liquid cooled in said first evaporator to said second evaporator, means for supplying lean absorbing solution to said first absorber, means for conducting absorbing solution from said first absorber to said second absorber, and means connecting said absorbers and evaporators to form an inert gas circuit so arranged that the inert gas flows in order through said second absorber, said first absorber, said second evaporator and said first evaporator, respectively.

OTIS B. SUTTON.

REFERENCES CITED

The following references are of record in the file of this patent:

UNITED STATES PATENTS

| Number | Name | Date |
|---|---|---|
| 1,711,553 | Von Platen et al. | May 7, 1929 |
| 1,955,298 | Knight | Apr. 17, 1934 |
| 1,976,202 | Thomas | Oct. 9, 1934 |
| 2,027,106 | Knight | Jan. 7, 1936 |
| 2,182,098 | Sellew | Dec. 5, 1939 |
| 2,321,113 | Taylor | June 8, 1943 |
| 2,326,900 | Thomas | Aug. 17, 1943 |

FOREIGN PATENTS

| Number | Country | Date |
|---|---|---|
| 317,052 | Great Britain | Nov. 6, 1930 |